(12) United States Patent
Sasaki

(10) Patent No.: US 7,161,600 B2
(45) Date of Patent: Jan. 9, 2007

(54) METHODS AND APPARATUS FOR TRANSFORMING THREE-DIMENSIONAL OBJECTS IN VIDEO GAMES

(75) Inventor: Ryusuke Sasaki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 766 days.

(21) Appl. No.: 10/042,713

(22) Filed: Jan. 26, 2001

(65) Prior Publication Data

US 2002/0167521 A1 Nov. 14, 2002

(30) Foreign Application Priority Data

Jan. 27, 2000 (JP) .......................... P2000-018303

(51) Int. Cl.
*G06T 13/00* (2006.01)
(52) U.S. Cl. ...................... 345/474; 345/473; 345/420; 345/440; 345/427; 345/653; 382/276
(58) Field of Classification Search ................ 345/419, 345/427, 473, 440, 420, 474; 382/276
See application file for complete search history.

(56) References Cited

U.S. PATENT DOCUMENTS 6,009,435 A * 12/1999 Taubin et al. ............... 707/101
6,317,130 B1 * 11/2001 Ishikawa et al. ............ 345/473
6,320,988 B1 * 11/2001 Yamaguchi et al. ........ 382/276

* cited by examiner

*Primary Examiner*—Kimbinh T. Nguyen
(74) *Attorney, Agent, or Firm*—Beyer Weaver & Thomas LLP

(57) ABSTRACT

An unprocessed cluster index and its amount of parallel movement are acquired. The order of processing clusters does not matter as long as the frame is the same. Subsequently, with respect to an unprocessed vertex corresponding to this acquired cluster index, a vertex index and the weight w of this vertex are obtained. Then, according to the amount of parallel movement and weight w in the same frame, the values of coordinates of the vertex buffer are changed. Since the cluster transformation is effected by parallel movement here, the order of processing clusters does not matter, and it is thereby possible to calculate the vertex coordinates after transformation by simple multiplication and addition alone without matrix operations.

10 Claims, 12 Drawing Sheets

| INDEX (210) | COORDINATES (x,y,z) (220) |
|---|---|
| vtx0 | ( -8 , 1 , -2 ) |
| vtx1 | ( -5 , 4 , 2 ) |
| vtx2 | ( -5 , 0 , 0 ) |
| vtx3 | ( 5 , 0 , 0 ) |
| vtx4 | ( 5 , 4 , 2 ) |
| vtx5 | ( 8 , 1 , -2 ) |
| ⋮ | ⋮ |

| INDEX (310) | NORMAL VECTOR (x,y,z) (320) |
|---|---|
| nml0 | ( 1 , 0 , 0 ) |
| nml1 | ( -1 , 0 , 0 ) |
| nml2 | ( 0 , 0 , -1 ) |
| nml3 | ( -1 , -1 , 0 ) |
| nml4 | ( 0 , -1 , 0 ) |
| ⋮ | ⋮ |

| 510 | NUMBER OF GROUPS | | 3 | |  |
|---|---|---|---|---|---|
| 520 | NUMBER OF VERTEXES | | 6 | | |
| 530 | VERTEX | vtx0 | WEIGHT | 0.5 | 540 |
| 532 | VERTEX | vtx1 | WEIGHT | 1.0 | 542 |
| 534 | VERTEX | vtx2 | WEIGHT | 1.0 | 544 |
| 536 | VERTEX | vtx3 | WEIGHT | 1.0 | 546 |
| 538 | VERTEX | vtx4 | WEIGHT | 1.0 | 548 |
| 539 | VERTEX | vtx5 | WEIGHT | 0.5 | 549 |
| 522 | NUMBER OF VERTEXES | | 2 | | |
| 550 | VERTEX | vtx4 | WEIGHT | 0.3 | 560 |
| 552 | VERTEX | vtx6 | WEIGHT | 0.2 | 562 |
| 524 | NUMBER OF VERTEXES | | 1 | | |
| 554 | VERTEX | vtx7 | WEIGHT | 0.5 | 564 |

VERTEX GROUP 0 (540–549)
VERTEX GROUP 1 (560–562)
VERTEX GROUP 2 (564)

Fig.6

| | | | |
|---|---|---|---|
| 610 | NUMBER OF CLUSTERS | 2 | |
| 620 | CLUSTER INDEX | clust 0 | clust 0 |
| 622 | REF PARALLEL MOVEMENT AMOUNT (x,y,z) | (0,0,0) | clust 0 |
| 624 | NUMBER OF VERTEX GROUPS | 2 | clust 0 |
| 626 | VERTEX GROUP ID | 3 | clust 0 |
| 628 | VERTEX GROUP ID | 2 | clust 0 |
| 630 | CLUSTER INDEX | clust 1 | clust 1 |
| 632 | REF PARALLEL MOVEMENT AMOUNT (x,y,z) | (0,0,0) | clust 1 |
| 634 | NUMBER OF VERTEX GROUPS | 1 | clust 1 |
| 636 | VERTEX GROUP ID | 0 | clust 1 |

600

METHODS AND APPARATUS FOR TRANSFORMING THREE-DIMENSIONAL OBJECTS IN VIDEO GAMES

BACKGROUND OF THE INVENTION

1. Field of the Invention

The present invention relates to computer graphics (CG) and, more specifically, to a technique for transforming a three-dimensional object in a virtual three-dimensional space.

2. Related Background Art

In CG, a technique called cluster transformation in general has been known as a technique for transforming a three-dimensional object whose form is determined by a plurality of vertexes, in order to express its fine actions and the like. In the cluster transformation, vertexes of a three-dimensional object are grouped into a plurality of groups, and each group forms a cluster. In each cluster, the vertexes belonging thereto are moved, so as to transform the three-dimensional object. Each vertex can belong to a plurality of clusters. Also, a weight can be set for the vertexes belonging to each cluster. Consequently, very fine transformations can be carried out as well.

The cluster transformation can effectively be utilized for transforming objects in video games as well. If the cluster transformation is employed for minutely deforming characters in a game, then it becomes easier to express them realistically.

Japanese Patent Application Laid-Open No. HEI 10-188028 has been known as an example in which the cluster transformation is applied to a video game. In the technique disclosed in this publication, for a three-dimensional object whose framework is defined by skeletons, joints and skeletons are also imparted to constituent parts lacking joints and bones in reality.

In the above-mentioned publication, a number of polygons constituting a three-dimensional object accompany a skeleton. A number of polygons accompanying a skeleton are controlled so as to rotate when the skeleton rotates. As a consequence, parts lacking joints and bones can be caused to perform minute movements. For example, in a three-dimensional object representing a human face, a polygon representing an eyelid is made to accompany a skeleton, and this skeleton is rotated. Hence, the three-dimensional object can be transformed such that the eyelid opens and closes.

However, a vertex rotating operation necessitates a greater use of matrix operations. Therefore, if there are a greater number of expression parts involving a minute transformation on a screen, then the load for processing them increases. Currently, there is a demand for a procedure which realizes a similar display mode while reducing the processing load.

SUMMARY OF THE INVENTION

Therefore, it is an object of the present invention to provide a technique which realizes fine transformations of three-dimensional objects by a simple process. The three-dimensional object transforming method in a video game for transforming a three-dimensional object having a form at least a part of which is determined by a plurality of vertexes associated with a cluster, in accordance with a first aspect of the present invention, includes acquiring, in each frame display period, an amount of parallel movement of the cluster according to animation data defining a movement of the three-dimensional object; and calculating, according to this acquired amount of parallel movement of the cluster and a weight predefined for each vertex corresponding to the cluster, an amount of parallel movement of each vertex and moving, according to this calculated amount of parallel movement, the vertexes parallel to each other in each frame display period.

Since only parallel movement is permitted with respect to the movement of vertexes belonging to a cluster, it becomes unnecessary to take account of transforming operations, and multiplication and addition would suffice without necessitating matrix operations. Namely, the amount of processing is reduced as a whole. Consequently, fine transformations of three-dimensional objects can be processed in real time.

Also, the method can be configured so as to further include moving, according to a movement of a joint in a virtual skeleton defining a framework of the three-dimensional object and including a plurality of joints, each of the plurality of vertexes being associated with at least one of the plurality of joints, the vertex corresponding thereto after the above-mentioned parallel movement of the vertexes.

If the movement of the corresponding vertex is introduced as mentioned above, a greater transformation will be performed after fine transformations of the three-dimensional object are carried out. As a consequence, the whole processing becomes simpler. For example, in the case of opening the mouth of a three-dimensional object of a human model and bending its neck in the configuration mentioned above, the neck would be bent after the lower lip portion is moved directly downward. Thus, the operation of opening the mouth and the operation of moving the lower lip portion directly downward correspond to each other one to one. In a configuration where the movement of the corresponding vertex is carried out before the parallel movement of the vertexes, however, the mouth would open after the neck is bent. When the neck is bent, the mouth will not open in a natural form even if the lower lip portion is moved directly downward. Hence, the lower lip portion has to be moved while taking account of how the neck bends.

Also, the method can be configured such that the above-mentioned acquisition of the amount of parallel movement of the cluster includes determining whether an amount of parallel movement of each cluster in a frame display period being processed is defined or not; calculating, if it is determined that the amount of parallel movement of each cluster in the frame display period being processed is not defined, the amount of parallel movement of each cluster in the frame display period being processed according to an amount of parallel movement of each cluster in a frame display period having already been processed and an amount of parallel movement of each cluster in a frame display period to be processed later; and acquiring, if it is determined that the amount of parallel movement of each cluster in the frame display period being processed is defined, the defined amount of parallel movement of each cluster in the frame display period being processed.

A program for causing a computer to execute the three-dimensional object transforming method in a video game in accordance with the first aspect of the present invention can be made. In this case, modifications such as those mentioned above with respect to the first aspect are also applicable to the program. The program in accordance with the present invention is stored in a recording medium or storage device, for example, such as CD-ROM (Compact Disc-Read Only Memory), DVD (Digital Versatile Disc), floppy disk, memory cartridge, memory, hard disk, or the like. When the program stored in a recording medium or storage device is read by the computer, a video game apparatus which will be explained in the following can be realized. Also, by means of a recording medium, the program in accordance with the present invention can easily be distributed and sold as a software product independently from apparatus. Further, if the program in accordance with the present invention is executed by use of hardware such as a computer, the technique of the present invention can easily be realized with hardware such as a computer.

In accordance with a second aspect of the present invention, the video game apparatus, which comprises a computer-readable storage medium storing a program for a video game which transforms a three-dimensional object having a form at least a part of which is determined by a plurality of vertexes associated with a cluster, and a computer which reads out at least one of said programs from the computer-readable storage medium to perform, by executing the read-out program, b acquiring, in each frame display period, an amount of parallel movement of the cluster according to animation data defining a movement of the three-dimensional object; and calculating, according to the amount of parallel movement of the cluster acquired in the acquiring and a weight predefined for each vertex corresponding to the cluster, an amount of parallel movement of each vertex and moving, according to thus calculated amount of parallel movement, the vertexes parallel to each other in each frame display period.

The video game apparatus in accordance with a third aspect of the present invention has a computer; and a computer-readable recording medium having recorded therein a program to be executed by the computer. The program causes the computer to perform an acquiring, in each frame display period, an amount of parallel movement of each cluster according to animation data defining a movement of the three-dimensional object; and calculating, according to the amount of parallel movement of the cluster acquired by the acquiring process and a weight predefined for each vertex corresponding to the cluster, an amount of parallel movement of each vertex and moving, according to thus calculated amount of parallel movement, the vertexes parallel to each other in each frame display period.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 shows a chart showing an example of a vertex coordinate list;
FIG. 3 shows a chart showing an example of a normal vector list;
FIG. 5 shows a chart showing an example of a vertex group list;
FIG. 6 shows a chart showing an example of cluster data.

DESCRIPTION OF THE PREFERRED EMBODIMENTS

Figure 1:
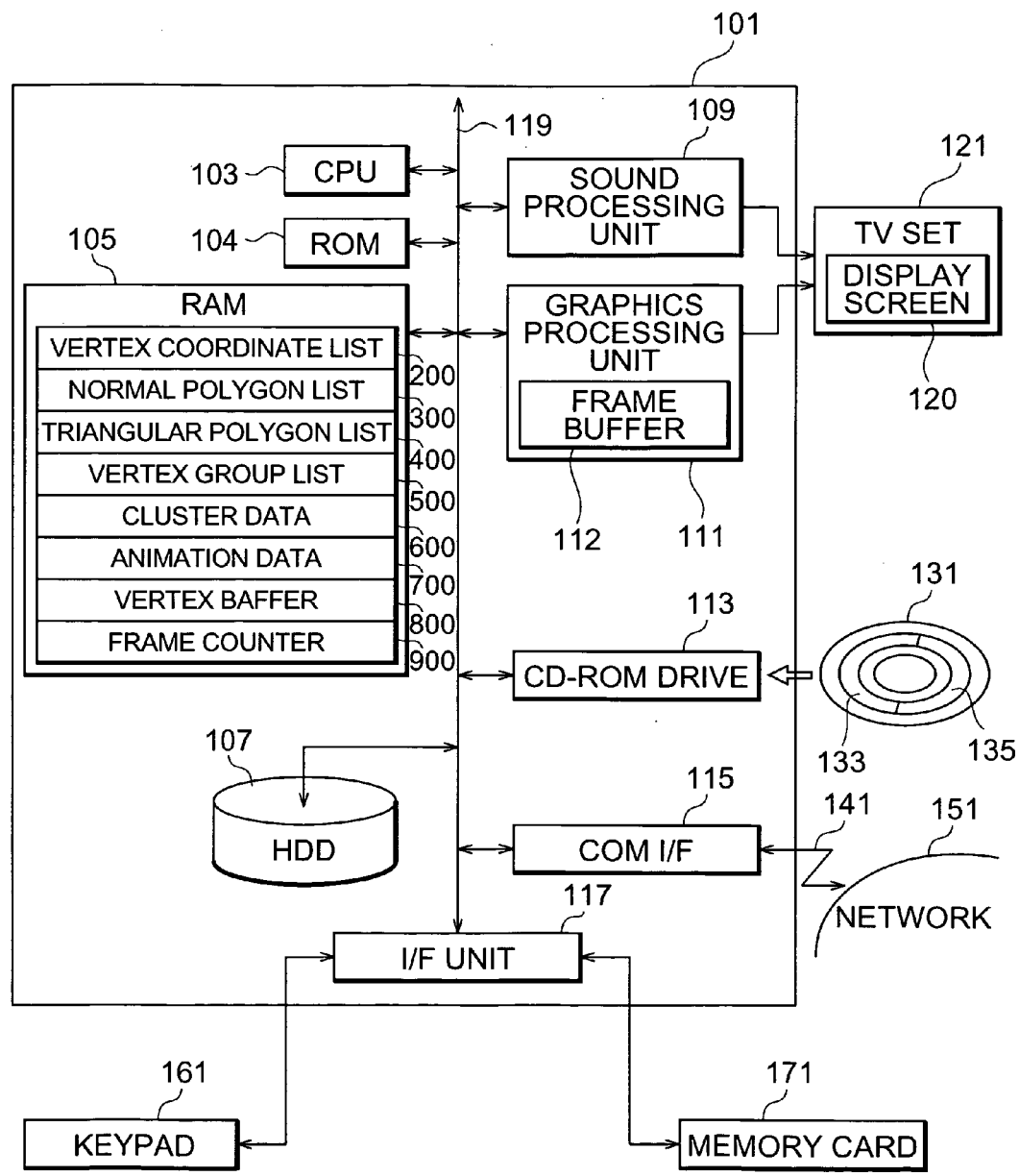
FIG. 1 shows a block diagram of a home game machine.

FIG. 1 shows an example of home game machine 101 which executes a computer program in the case where the present invention is carried out by the computer program. The home game machine 101 comprises, for example, a CPU (Central Processing Unit) 103, a ROM (Read Only Memory) 104, a RAM (Random Access Memory) 105, an HDD (Hard Disk Drive) 107, a sound processing unit 109, a graphics processing unit 111, a CD-ROM drive 113, a communications interface 115, and an interface unit 117 which are connected to an internal bus 119. The graphics processing unit 111 is equipped with a frame buffer 112.

The sound processing unit 109 and graphics processing unit 111 of the home game machine 101 are connected to a TV set 121 having a display screen 120. A removable CD-ROM 131 is inserted into the CD-ROM drive 113. A game program 133 and data 135 in accordance with the present invention are recorded on the CD-ROM 131. The communications interface 115 is connected to a network 151 via a communications medium 141. A keypad 161 equipped with operation buttons and a memory card 171 are connected to the interface unit 117.

The CPU 103 executes a program stored in the ROM 104 and the game program 133 recorded on the CD-ROM 131, thereby controlling the home game machine 101. The RAM 105 is a work area for the CPU 103. The HDD 107 is a storage area for keeping the game program 133 and data 135 recorded on the CD-ROM 131, for example. The memory card 171 is a storage area for saving data which the game program 133 refers to. In the case where the program executed by the CPU 103 commands that sounds be outputted, the sound processing unit 109 interprets this command and outputs a sound signal to the TV set 121.

According to a drawing instruction outputted from the CPU 103, the graphics processing unit 111 generates image data and writes this generated data into the frame buffer 112. Then, to the TV set 121, the graphics processing unit 111 outputs a signal for displaying this written image data onto the display screen 120. The CD-ROM drive 113 reads out the game program 133 and data 135 on the CD-ROM 131. The communications interface 115 is connected to the network 151 via the communications medium 141, and controls the input/output of data communications carried out with other computers and the like. The interface unit 117 outputs the input from the keypad 161 into the RAM 105, whereas the CPU 103 interprets the input from the keypad 161 and carries out arithmetic operations.

The game program 133 and data 135 in accordance with the present invention are initially recorded on the CD-ROM 131, for example. Upon execution, the game program 133 and data 135 are read out by the CD-ROM drive 113 and are loaded into the RAM 105. The data 135 loaded into the RAM 105 includes, as shown in FIG. 1, a vertex coordinate list 200, a normal vector list 300, a triangular polygon list 400, cluster data 600, and animation data 700. Also, data employed during the processing of the program in accordance with the present invention includes a vertex buffer 800 and a frame counter 900. They will be explained in detail in the following. The game program 133 and data 135 in accordance with the present invention recorded on the CD-ROM 131 may be read out by the CD-ROM drive 113 beforehand and stored in the HDD 107. In the case where the game program 133 and data 135 in accordance with the present invention are stored in the HDD 107, the game program 133 and data 135 are loaded into the RAM 105 from the HDD 107.

In accordance with the present invention the CPU 103 processes the game program 133 and data 135 in accordance with the present invention loaded in the RAM 105, and outputs a drawing instruction to the graphics processing unit 111. Here, intermediate data are loaded into the RAM 105 for storage. The graphics processing unit 111 carries out processing operations according to the drawing instruction from the CPU 103, writes image data into the frame buffer 112, and outputs to the TV set 121 a signal for displaying the image data onto the display screen 120.

Algorithms of the program in accordance with the present invention executed in the foregoing home game machine 101 and data employed therein will now be explained in detail.

FIGS. 2, 3, 4, 5, 6 and 7 explain the data employed in the present invention.

FIG. 2 shows the vertex coordinate list 200 concerning vertexes of a three-dimensional object in the case where the three-dimensional object is constituted by triangular polygons. The vertex coordinate list 200 includes a column 210 for vertex coordinate indexes (index) and a column 220 for coordinates (x, y, z).

In FIG. 2, the vertex of vertex index vtx0 has coordinates of (−8, 1, −2). The vertex of vertex index vtx1 has coordinates of (−5, 4, 2). The vertex of vertex index vtx2 has coordinates of (−5, 0, 0). The vertex of vertex index vtx3 has coordinates of (5, 0, 0). The vertex of vertex index vtx4 has coordinates of (5, 4, 2). The vertex of vertex index vtx5 has coordinates of (8, 1, −2). The vertex coordinates in the vertex coordinate list 200 are relative positional coordinates from a predetermined reference position.

FIG. 3 shows the normal vector list 300. The normal vector list 300 is a list for defining the normal vector at each vertex of triangular polygons. The normal vector list 300 includes a column 310 for normal vector indexes (index) and a column 320 for normal vectors (x, y, z).

In FIG. 3, the normal vector of normal vector index nm10 is (1, 0, 0). The normal vector of normal vector index nm11 is (−1, 0, 0). The normal vector of normal vector index nm12 is (0, 0, −1). The normal vector of normal vector index nm13 is (−1, −1, 0). The normal vector of normal vector index nm14 is (0, −1, 0).

Figure 4:
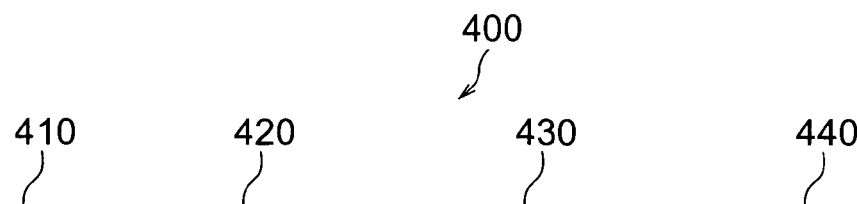
FIG. 4 shows a chart showing an example of a triangular polygon list.

FIG. 4 shows the triangular polygon list 400. The triangular polygon list 400 stores the vertex indexes and normal vector indexes of vertexes 0, 1 and 2 constituting each triangular polygon. The triangular polygon list 400 includes a column 410 for triangular polygon indexes (index), a column 420 concerning vertex 0 for the vertex index of the vertex constituting vertex 0 and the normal vector index of the normal vector thereof, a column 430 concerning vertex 1 for the vertex index of the vertex constituting vertex 1 and the normal vector index of the normal vector thereof, and a column 440 concerning vertex 2 for the vertex index of the vertex constituting vertex 2 and the normal vector index of the normal vector thereof.

In FIG. 4, the vertex 0 of the triangular polygon of triangular polygon index plg0 is constituted by the vertex of vertex index vtx0 and the normal vector of normal vector index nm10. The vertex 1 of the triangular polygon of triangular polygon index plg0 is constituted by the vertex of vertex index vtx1 and the normal vector of normal vector index nm12. The vertex 2 of the triangular polygon of triangular polygon index plg0 is constituted by the vertex of vertex index vtx2 and the normal vector of normal vector index nm13.

The vertex 0 of the triangular polygon of triangular polygon index plg1 is constituted by the vertex of vertex index vtx0 and the normal vector of normal vector index nm11. The vertex 1 of the triangular polygon of triangular polygon index plg1 is constituted by the vertex of vertex index vtx2 and the normal vector of normal vector index nm13. The vertex 2 of the triangular polygon of triangular polygon index plg1 is constituted by the vertex of vertex index vtx3 and the normal vector of normal vector index nm14.

When the vertex coordinate list 200 and the normal vector list 300 are provided, while the triangular polygon list 400 storing the vertex index and normal vector index is prepared separately, data of identical vertex coordinates and data of identical normal vectors can commonly be used in the triangular polygon list 400. Also, with respect to the same vertex, normal vectors separately may be defined for every polygon.

Vertexes defining the form of a three-dimensional object are grouped. Here, each vertex may belong to a plurality of groups. FIG. 5 shows the vertex group list 500. The vertex group list 500 stores the number of vertex groups; and, for each vertex group, the number of vertexes belonging to the vertex group, each vertex index of the vertexes belonging to the vertex group, and the weight predefined for each vertex. Hence, the vertex group list 500 is provided with a column 510 for the number of groups, columns 520, 522 and 524 for the numbers of vertexes, columns 530, 532, 534, 536, 538, 539, 550, 552 and 554 for vertex indexes, and columns 540, 542, 544, 546, 548, 549, 560, 562 and 564 for the weights of vertexes. Data for a new vertex group begins from a new column for the number of vertexes.

In FIG. 5, the group number column 510 indicates that the number of groups is 3. The vertex number column 520 for the vertex group 0 indicates that the number of vertexes in the vertex group 0 is 6. The vertex index column 530 for a vertex belonging to the vertex group 0 stores vertex index vtx0. The weight column 540 corresponding to the vertex index vtx0 stores a weight of 0.5. The vertex index column 532 for a vertex belonging to the vertex group 0 stores vertex index vtx1. The weight column 542 corresponding to the vertex index vtx1 stores a weight of 1.0.

The vertex index column 534 for a vertex belonging to the vertex group 0 stores vertex index vtx2. The weight column 544 corresponding to the vertex index vtx2 stores a weight of 1.0. The vertex index column 536 for a vertex belonging to the vertex group 0 stores vertex index vtx3. The weight column 546 corresponding to the vertex index vtx3 stores a weight of 1.0. The vertex index column 538 for a vertex belonging to the vertex group 0 stores vertex index vtx4. The weight column 548 corresponding to the vertex index vtx4 stores a weight of 1.0. The vertex index column 539 for a vertex belonging to the vertex group 0 stores vertex index vtx5. The weight column 549 corresponding to the vertex index vtx5 stores a weight of 0.5.

The vertex number column 522 for the vertex group 1 indicates that the number of vertexes in the vertex group 1 is 2. The vertex index column 550 for a vertex belonging to the vertex group 1 stores vertex index vtx4. The weight column 560 corresponding to the vertex index vtx4 stores a weight of 0.3. The vertex index column 552 for a vertex belonging to the vertex group 1 stores vertex index vtx6. The weight column 562 corresponding to the vertex index vtx6 stores a weight of 0.2.

The vertex number column 524 for the vertex group 2 indicates that the number of vertexes in the vertex group 2 is 1. The vertex index column 554 for the vertex belonging to the vertex group 2 stores vertex index vtx7. The weight column 564 corresponding to the vertex index vtx7 stores a weight of 0.5. In this embodiment, each weight is a real number of at least 0 but not greater than 1.

In this embodiment, transformation is carried out for each cluster. FIG. 6 shows the cluster data 600. The cluster data 600 includes a reference amount of parallel movement for each cluster and information concerning vertex groups included in the cluster. Here, there may exist a vertex group included in a plurality of clusters. The cluster number column 610 stores the number of clusters included in the cluster data 600. It is 2 in the example of FIG. 6.

A cluster index (index) column 620 stores the index of a cluster included in the cluster data 600. It is cluster clust0 in the example of FIG. 6. The column 622 for the reference amount of parallel movement (x, y, z) of the cluster clust0 stores a reference amount of parallel movement (0, 0, 0). The column 624 for the number of vertex groups belonging to the cluster clust0 stores the number of vertex groups belonging to the cluster clust0, i.e., 2, in the vertex groups included in the vertex group list 500. Specifically, vertex group ID columns 626 and 628 for vertex groups belonging to the cluster clust0 store the vertex group IDs 3 and 2, respectively.

From a column 630 for a new cluster index (index) to the next cluster index column, an area for storing data for a new cluster is formed. The cluster index column 630 stores cluster index clust1. The column 632 for the reference amount of parallel movement (x, y, z) of the cluster clust1 stores a reference amount of parallel movement (0, 0, 0). The column 634 for the number of vertex groups belonging to the cluster clust1 stores the number of vertex groups belonging to the cluster clust1, i.e., 1. Specifically, the vertex group ID column 636 for vertex groups belonging to the cluster clust1 stores the vertex group ID 0.

Figure 7A:
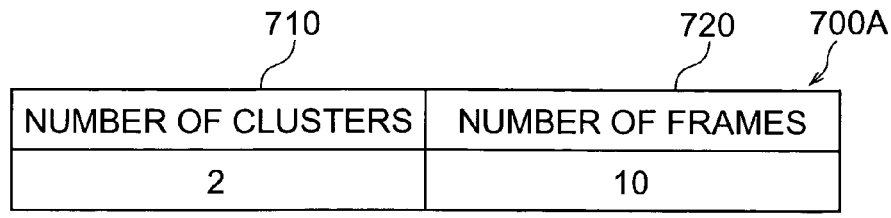
FIGS. 7A and B show charts showing examples of animation data.
Figure 7B:
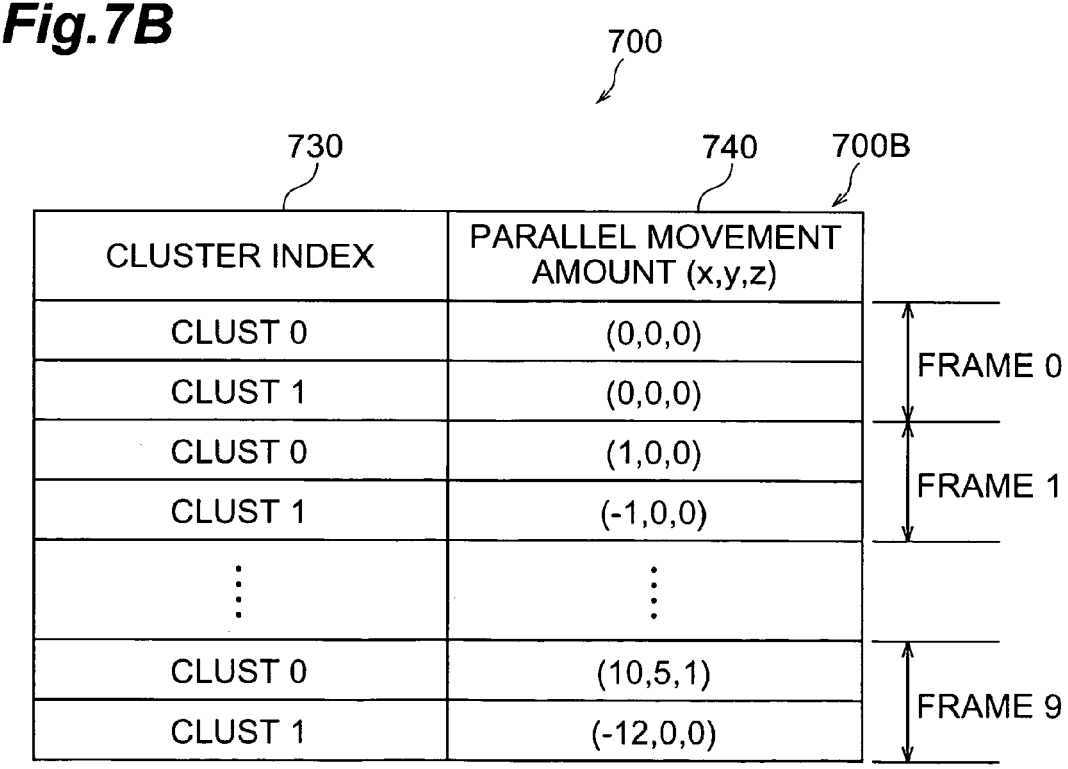

A transforming operation for clusters in a three-dimensional object is carried out according to the animation data 700 shown in FIGS. 7A and 7B. The animation data 700 includes animation data 700A (in FIG. 7A) defining the number of clusters and the number of frames, and animation data 700B (in FIG. 7B) defining the amount of parallel movement of each cluster moving in each frame display period from the starting of the transformation to the end thereof.

In FIG. 7A, the number of moving clusters is stored in the column 710 for the number of clusters in the animation data 700A. It is 2 in the example in FIG. 7A. The number of frame display periods from the starting of the transformation to the end thereof is stored in the frame number column 720. It is 10 in the example in FIG. 7A. Subsequently, in response to the number of moving clusters, 2, the respective amounts of parallel movement of the clusters in each frame display period are defined in every two consecutive rows of the animation data 700B (in FIG. 7B). The cluster index (index) column 730 stores the indexes of moving clusters. The column 740 for the amount of parallel movement (x, y, z) stores the amount of parallel movement from a reference posture.

The amount of parallel movement of cluster clust0 in frame 0 is (0, 0, 0). The amount of parallel movement of cluster clust1 is also (0, 0, 0). These indicate that the state is identical to the reference posture. The amount of parallel movement of cluster clust0 in frame 1 is (1, 0, 0). On the other hand, the amount of parallel movement of cluster clust1 is (−1, 0, 0). Such data continue up to frame 9. The amount of parallel movement of cluster clust0 in frame 9 is (10, 5, 1). On the other hand, the amount of parallel movement of cluster clust1 is (−12, 0, 0).

In cluster transformations including such operations as rotation, enlargement/reduction, shearing, and the like, it has been necessary for the operations to be carried out in conformity to a predetermined order. In the present invention, however, transformations can be carried out by cluster operations independent of orders since both the reference position and moving amount of clusters are restricted to parallel movement. Also, the amount of arithmetic operations used is much lower than that in cluster transformations including rotation, enlargement/reduction, shearing, and the like.

In the case of fine transformations for effecting facial or muscular expressions, changes in expressions and the like can fully be represented even when the transformations are restricted to parallel movement. While the animation data 700 is usually made by human hands, the labor of making the animation data 700 will not differ from that in cluster transformations including rotation and the like even if the cluster transformations are restricted to parallel movement.

Data such as those mentioned above are employed in this embodiment. Before explaining the processing of the program in this embodiment, the principle of an operation will be explained with reference to FIGS. 8A, 8B, and 8C.

Figure 8A:
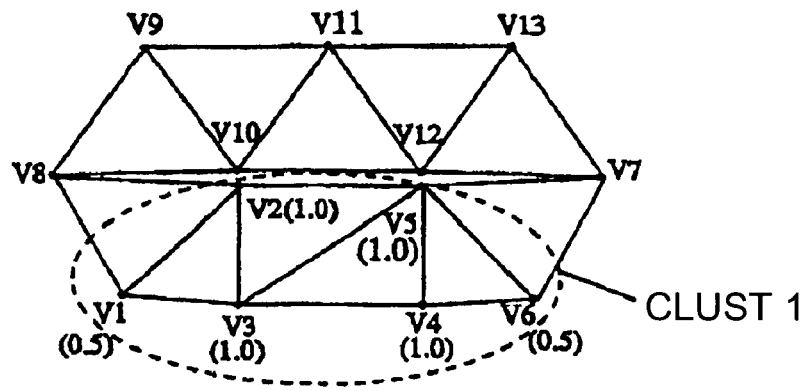
FIG. 8A is a schematic view showing a state before a cluster transformation.

FIG. 8A shows the state before moving a cluster. FIG. 8A shows positions of vertexes constructing a lip. In this example, the lip is constructed by vertexes arranged at thirteen positions V1, V2, V3, V4, V5, V6, V7, V8, v9, V10, V11, V12 and V13. In this example, the lower lip is constructed by each vertex of group 0. The positions of each vertexes vtx0, vtx1, vtx2, vtx3, vtx4, and vtx5 before moving thereof, by which the lower lip is constructed, are the positions V1, V2, V3, V4 and V5 respectively. The weights of the vertexes vtx0 and vtx5 are 0.5 and the weights of vertexes vtx1, vtx2, vtx3 and vtx4 are 1.0. (See FIG. 5).

Assuming that the lower lip is moved downward so as to express his face expression that the human shaped character is opening his mouth, for example, clust0 belong to the vertex group0 is moved downward in parallel.

Figure 8B:
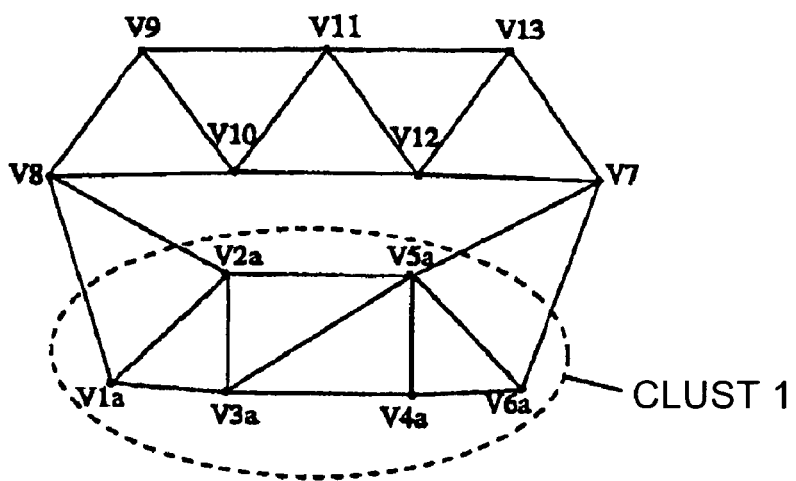
FIG. 8B is a schematic view showing a state where the cluster transformation is carried out while the weight of all the vertexes belonging to the cluster C is set to 100%.

FIG. 8B shows a shape of a lip in the case that clust0 shown in FIG. 8A is moved downward without applying the process of the present embodiment thereto. In this example, each vertex included in clust0 is moved by the same moving amount as that of clust0. In this case, all of the vertexes vtx0, vtx1, vtx2, vtx3, vtx4 and vtx5 of the lower lip after the parallel movement of clust0, are moved in parallel by the same amount of movement and they are moved to positions V1a, V2a, V3a, V4a, V5a and V6a. In this case, the shape of the lip becomes angular (an outline of the lip has an angle near to a right angle) and therefore, it has unnatural shape as a human skin.

Figure 8C:
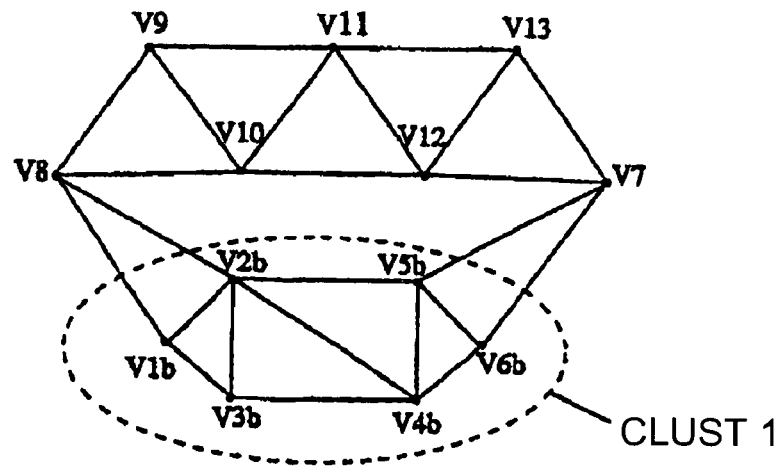
FIG. 8C is a schematic view showing a state where the cluster transformation is carried out by use of the present invention.

FIG. 8C shows a shape of a lip in the case that clust0 shown in FIG. 8A is moved downward by applying the process of the present embodiment thereto. In the case that the process according to the present invention is applied, each of the vertexes vt0, vtx1, vtx2, vtx3, vtx4 and vtx5 constructing the lower lip is moved downward in parallel by the amount of movement according to the its respective weight. In this example, the weights of vtx0 and vtx5 are 0.5, and the weights of the other vertexes Vtx1, vtx2, vtx3 and vtx4 are 1.0. Accordingly, the amounts of movements of vertexes vtx0, vtx5 is one half (50%) of those of clust0. The amounts of movements of vertexes vtx1, vtx2, vtx3 and vtx 4 is the same (100%) as that of clust0.

Accordingly, by the movement of clust0 downward, vtx0 and vtx5 with weights of 0.5 are moved to positions V1b and V6b, which are higher than positions V1a and V6a as shown in FIG. 8B. While vertexes vtx1, vtx2, vtx3 and vtx 4 with weights of 1.0 are moved to the same positions V2b, V3b, V4b and V5b as those corresponding positions (V2a, V3a, V4a, and V5a) shown in FIG. 8B.

Although in FIG. 8A, the positions of vertexes vtx0, vtx5 and vertexes vtx2, vtx3 have substantially the same vertical position (as represented by positions V1, V3, v4, and V6), after their movement according to this embodiment of the present invention, they thus show greater deviation from such a common vertical position. That is, vertexes vtx0 and vtx5 show a smaller amounts of movement than that exhibited by the other vertexes and therefore the lip in FIG. 8C has a round shape in comparison with that shown in FIG. 8B. Accordingly, it is possible to express a natural shape of the lip when the human opens his mouth.

FIG. 8B shows a case where the cluster C of FIG. 5A is moved down in parallel. Here, the parallel movement is made with the vertexes V1 and V6 having a weight of not 0.5 but 1.0. Namely, all the vertexes belonging to the cluster C have the same weight. The respective positions of vertexes V1a to V6a have moved down simply and equally from their corresponding positions shown in FIG. 8A.

As in the foregoing, when moving each cluster in parallel, the amount of movement is changed by use of weights predefined for vertexes.

In view of the principle of operation explained in the foregoing, a processing flow of an object transforming operation in this embodiment will be explained with reference to FIGS. 9 to 11.

Upon startup, according to the operating system stored in the ROM 104 and the like, the CPU 103 reads out the game program 133 and data 135 necessary for executing image processing and games from the CD-ROM 131 via the CD-ROM 113, and transfers them to the RAM 105. Then, by executing the game program 133 transferred to the RAM 105, the CPU 103 realizes the processing set forth in the following description.

Here, the control and processing operations performed in the home game machine 101 include those in which actual control and processing operations are carried out by circuits other than the CPU 103 in cooperation with the CPU 103. For convenience of explanation, however, the control and processing operations involving the CPU 103 will be explained in the following as being directly executed by the CPU 103.

In practice, the game program 133 and data 135 necessary for executing the image processing and games are sequentially read out from the CD-ROM 131 and transferred to the RAM 105 according to the progress of the processing under the command of the CPU 103. However, for easier understanding of the invention, the readout from the CD-ROM 131 and transfer to the RAM 105 will not be described in the following explanation.

If the game program 133 and data 135 necessary for executing the image processing and games are stored in the HDD 107, then they will sequentially be read out from the HDD 107 and transferred to the RAM 105 according to the progress of the processing under the command of the CPU 103. However, for a reason similar to that mentioned above, the readout from the HDD 107 and transfer to the RAM 105 will not be described in the following explanation.

Figure 9:
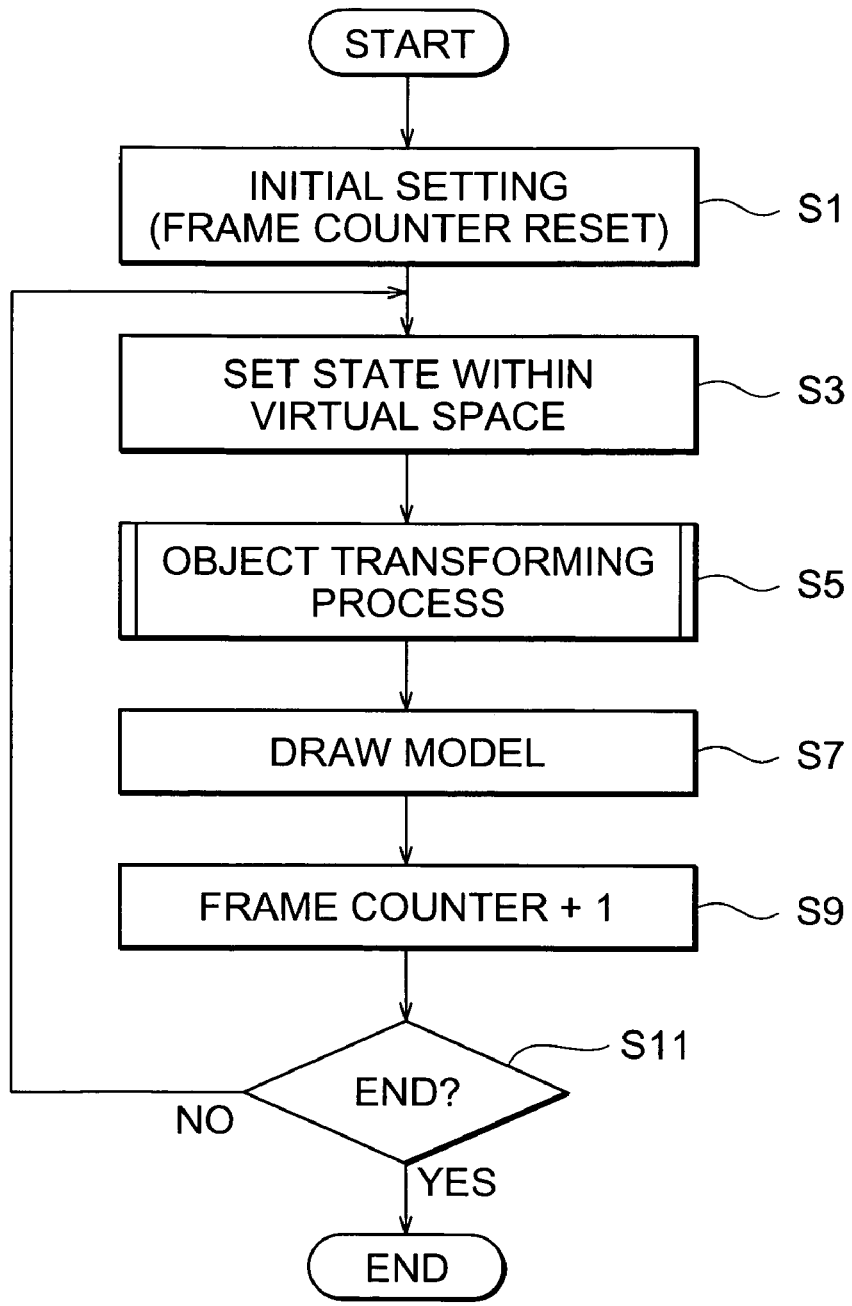
FIG. 9 shows a flowchart showing a main flow of the processing in accordance with the present invention.

FIG. 9 shows a main flow in accordance with this embodiment. First, an initial setting is effected (step S1). In this initial setting, data such as those shown in FIGS. 2 to 7 are loaded into the RAM 105. Also, the frame counter 900 is reset to 0. Subsequently, a state within a virtual space is set (step S3). Setting a state within a virtual space is a process in which, for example, when animation of a three-dimensional object is instructed to start upon a user's manipulation of the keypad 161 or when a viewpoint position is changed similarly upon a user's manipulation of the keypad 161, the state in the virtual space is changed accordingly.

Then, an object transforming process in accordance with the present invention is carried out (step S5). This will be set forth later in detail. The transformed three-dimensional object is subjected to a drawing process (step S7). Here, light-source calculation, perspective transformation, and the like are carried out so as to draw a picture of the three dimensional object in the frame buffer 112, in the drawing process with respect to the three-dimensional object. In this embodiment, the drawing process does not differ from a conventional one. Subsequently, an increment of 1 is added to the frame counter 900 (step S9). Then, it is determined whether the processing is completed or not (step S11). If the value of the frame counter 900 indicates the completion of the processing, then the operation is terminated. If the value of the frame counter 900 does not indicate the completion of the processing, then the operation returns to step S3.

Figure 10:
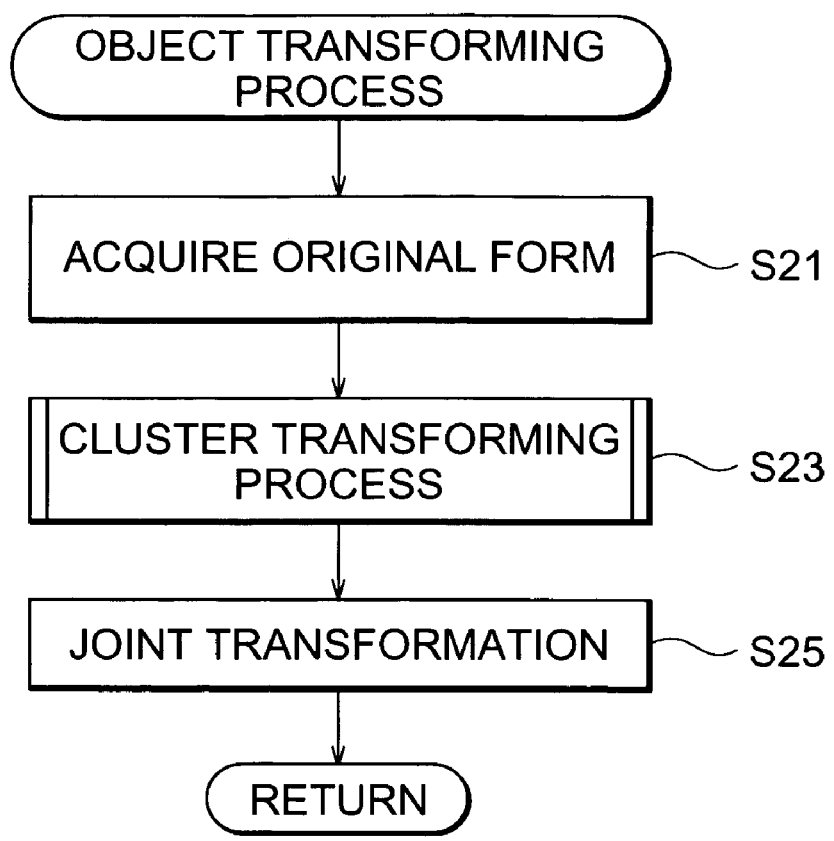
FIG. 10 shows a flowchart of the three-dimensional object transforming process in accordance with the present invention.

FIG. 10 shows a flow of the object transforming process. First, an original form of the three-dimensional object is acquired (step S21) Here, the vertex coordinate list 200 copied to the RAM 105 is copied, so as to generate the vertex buffer 800. Subsequently, a cluster transforming process in accordance with the present invention is carried out (step S23). This cluster transforming process will be set forth later in detail. Then, a joint transforming process is carried out (step S25). Thereafter, the operation shifts to step S7 in FIG. 9.

The joint transforming process is performed as follows. For example, in the case where a three-dimensional object of a human model is to be transformed, joints corresponding to human joints are defined. Individual vertexes determining the form of the three-dimensional object are associated with each joint together with their relative positions from the joint. Also, the joints are connected to each other by bones corresponding to human bones, while each joint rotates such that the bones rotate about joint portions. As the joint rotates, the positional coordinates of vertexes and normal vectors associated with the joint are changed, whereby a relatively large transforming process corresponding to movements of human bones is effected.

One characteristic feature of the present invention lies in that the cluster transforming process is carried out before the joint transforming process. According to this order, large transformations are effected after fine transformations of the three-dimensional object are carried out. For example, if the processing is effected in this order in the case of opening the mouth of a three-dimensional object of a human model and bending its neck, the neck will be bent after the lower lip portion is moved directly downward. Here, the operation of opening the mouth and the operation of moving the lower lip portion directly downward correspond to each other one to one. If this order is reversed, however, the mouth will open after the neck is bent. When the neck is bent, the mouth will not open in a natural form even if the lower lip portion is moved directly downward. Therefore, the lower lip portion has to be moved while taking account of how the neck bends. Hence, the processing flow of FIG. 10 simplifies the whole operation.

Figure 11:
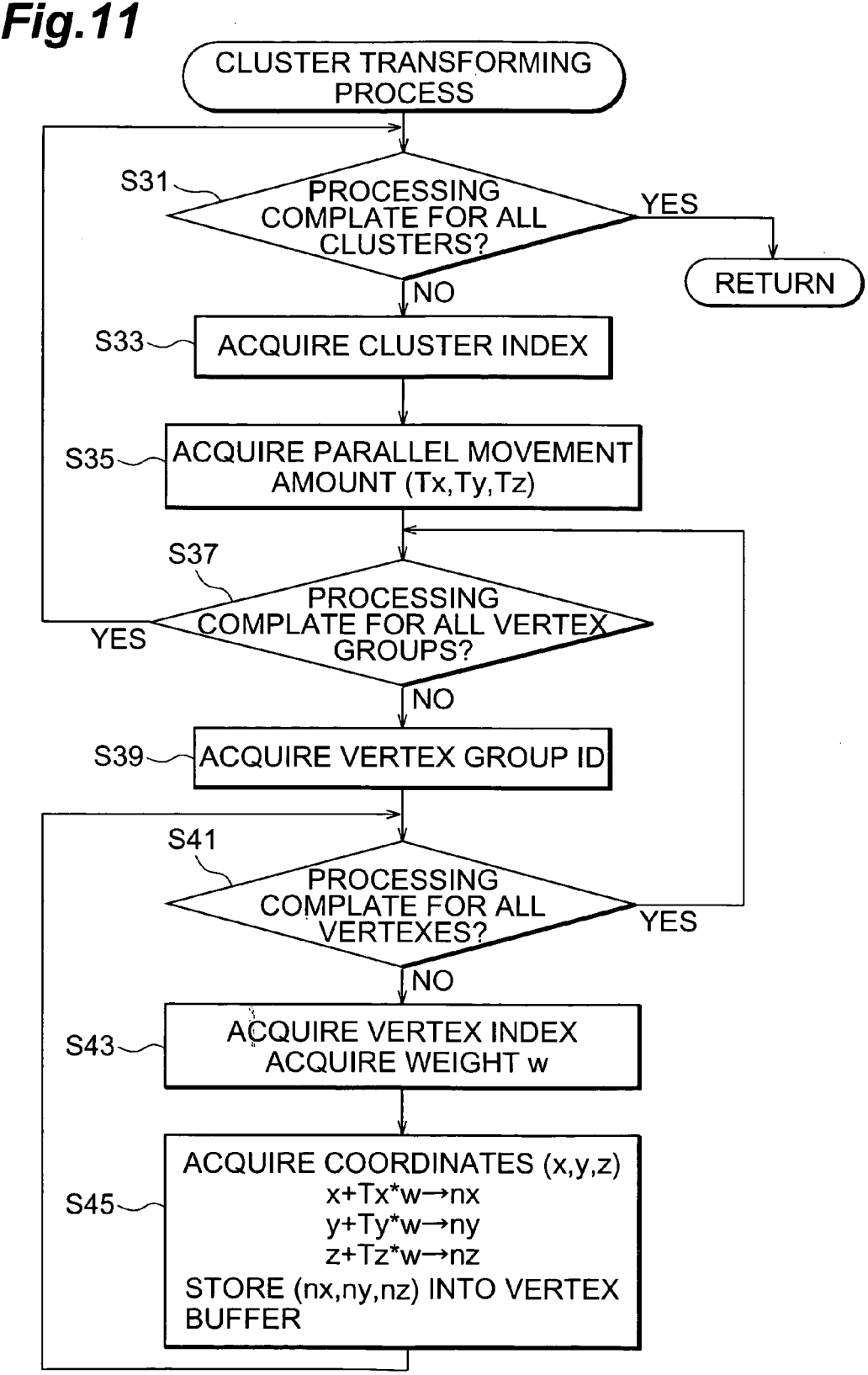
FIG. 11 shows a flowchart of the cluster transforming process in accordance with the present invention.

FIG. 11 shows details of the cluster transforming process. First, it is determined whether the transforming process has been carried out for all the clusters or not (step S31). If the transforming process has been carried out for all the clusters, then the operation shifts to step S25 in FIG. 10. If the transforming process has not been completed for all the clusters, then the operation shifts to step S33. At this stage, it is assumed that the frame display period being processed can be seen from the value of the frame counter 900.

At step S33, a cluster index is acquired from the animation data 700 (step S33). Then, the amount of parallel movement (Tx, Ty, Tz) concerning this acquired cluster index is obtained (step S35). In the animation data 700, the order of clusters being processed does not matter as long as their frame display period is the same. Because of this fact the transformation is limited to parallel movement.

Subsequently, it is determined whether the moving process has been completed for all the vertex groups associated with the acquired cluster index (step S37). If the moving process has been completed for all the vertex groups associated with the acquired cluster index, then the operation returns to step S31 in order to shift to the processing of the next cluster index. If the moving process has not been completed for all the vertex groups associated with the acquired cluster index, then an unprocessed vertex group ID is acquired from the cluster data 600.

Then, the vertex group list 500 is referred to, so as to determine whether the moving process has been completed for all the vertexes belonging to the acquired vertex group ID or not (step S41). The vertex group list 500 includes no information concerning the vertex group ID. However, the vertex group list 500 can be scanned from the top, so as to grasp the vertex group ID according to the number of occurrences of rows 520 to 524 indicating their respective numbers of vertexes. Namely, since the number of occurrences of vertex number rows 520 to 524 minus 1 indicates the vertex group ID, vertex information concerning the acquired vertex group ID can be obtained if the vertex group list 500 is scanned from the top until the number of occurrences of vertex number rows 520 to 524 minus 1 equals the acquired vertex group ID.

If the moving process has been completed for all the vertexes belonging to the acquired vertex group ID, then the operation returns to step S37. If the moving process has not been completed for all the vertexes belonging to the acquired vertex group ID, then an unprocessed vertex index is acquired from the vertex group list 500, and the weight w (which is a real number of at least 0 but not greater than 1) of the vertex is similarly acquired from the vertex group list 500 (step S43).

Then, according to the amount of parallel movement (Tx, Ty, Tz) in this frame display period and the weight w, the coordinate information in the vertex buffer 800 is changed (step S45). Namely, new coordinates (nx, ny, nz) in the case where the coordinates of the vertex being processed are assumed to be (x, y, z) are calculated according to the following expression:

$$nx = x + Tx \times w$$
$$ny = y + Ty \times w \quad (1)$$
$$nz = z + Tz \times w$$

The resulting new coordinates (nx, ny, nz) are stored in the vertex buffer 800.

Thus, the value of coordinates of the vertex is updated. The updated vertex coordinates are stored in the vertex buffer 800, and a three-dimensional object is drawn in the frame buffer 112 according to the contents of the vertex buffer.

After the step S45, the operation returns to the step S41, and then steps S43 and S45 are carried out until the moving process is completed for all the vertexes in the vertex group.

In the cluster transforming process, the process of transforming normal vectors may be omitted. Though recalculation is necessary to be exact, the resulting image quality will not differ in the case of fine transformations even without recalculating normal vectors.

As mentioned in the foregoing, when a three-dimensional object whose form is determined by a plurality of vertexes each associated with at least one cluster is to be transformed, the amount of parallel movement of each cluster is acquired in each frame display period (step S35). Then, in each frame display period, the amount of parallel movement of each acquired cluster is changed per each vertex corresponding to the cluster according to the weight predefined for the vertex, and the vertex is moved according to this changed amount of parallel movement (step S45).

The vertex moves by the amount of parallel movement in which the amount of parallel movement of its corresponding cluster is changed by the weight defined for itself. When the vertex corresponds to a plurality of clusters, then it is moved in parallel a plurality of times in one frame display period. The order of operations does not matter even when the parallel movement is carried out a plurality of times. Also, the parallel movement of the vertex can be effected by multiplication and addition alone, whereby the load of arithmetic operation is lower than that in the case of rotary movement which necessitates matrix operations.

Namely, if the movement of vertexes belonging to a cluster is restricted to parallel movement alone, then it becomes unnecessary to take account of the order of transforming operations, and multiplication and addition will suffice without necessitating matrix operations. Since no matrix operations are carried out, the amount of processing decreases, thereby facilitating the real-time processing of fine transformations of a three-dimensional object. The present invention is particularly effective in the case where the three-dimensional object has a large number of vertexes.

Also, since the object transformation is carried out in the order of the cluster transforming process and the joint transforming process as shown in the object transforming process of FIG. 10, the cluster transformation can be formulated, whereby the processing becomes simpler as a whole.

DISPLAY EXAMPLE

Figure 12:
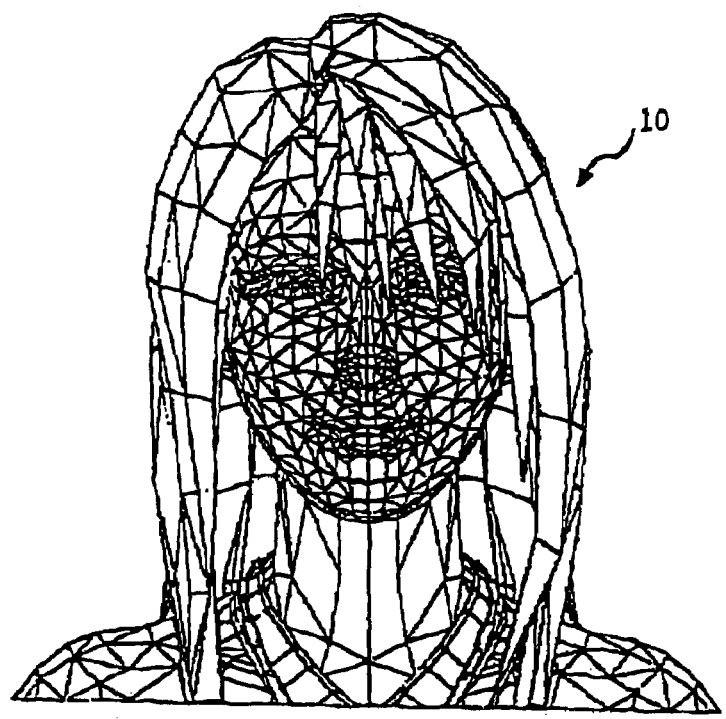
FIG. 12 is a view showing a polygon model of a three-dimensional object in a state before a transformation.

FIG. 12 shows a polygon model of a three-dimensional object 10 before a transformation. FIG. 12 shows the head of the three-dimensional object 10 of a human model as viewed from the front side The head is a part to which particular attention is paid, and it can be seen that the head is constituted by a number of polygons. In particular, in order to represent an abundance of expressions by minute movements, the eye and mouth parts in the head are constituted by a very large number of polygons. For a transformation of opening the mouth, it will not be sufficient if the cluster of the lower lip portion is moved down alone, but a transformation is effected such that a plurality of clusters are moved in parallel, so as to open the mouth in a more natural form.

Figure 13:
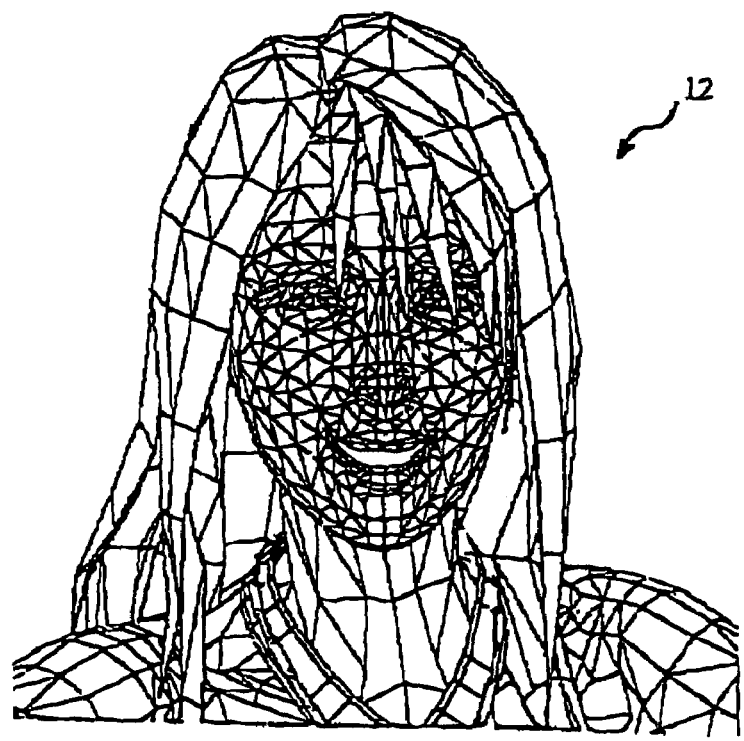
FIG. 13 is a view showing the polygon model of a three-dimensional object in a state after the transformation.

FIG. 13 shows a polygon model of a three-dimensional object 12 after the transformation. FIG. 13 is identical to FIG. 12 in that the head of the three-dimensional object 12 of a human model is shown therein, but differs therefrom in that the posture of the three-dimensional object is changed, and that the mouth is open. The posture of the three-dimensional object is changed in the joint transforming process (FIG. 10; step S25). In the present invention, the cluster transforming process (step S23) for opening the mouth is carried out before the joint transforming process. In FIG. 13, clusters are provided in a portion extending from the lower lip to the lower jaw, and are moved downward. Also, minute transformations such as those of laterally moving clusters disposed at cheek portions are implemented.

Figure 14:
FIG. 14 shows an example of a display screen of the three-dimensional object shown in FIG. 12.
Figure 15:
FIG. 15 shows an example of a display screen of the three-dimensional object shown in FIG. 13.

FIG. 14 shows an example of a display screen in which the three-dimensional object 10 shown in FIG. 12 is drawn. It can be seen that, though the method of drawing is identical to a conventional one, a smoother three-dimensional object is drawn. On the other hand, FIG. 15 shows an example of display screen in which the three-dimensional object 12 shown in FIG. 13 is drawn. It can be seen that, while a transformation of opening the mouth is effected in the three-dimensional object 10 in accordance with the present invention, the smooth three-dimensional object 12 is drawn with its mouth being open in a natural form.

The following modifications are applicable to the above embodiments.

(Modification 1)

The animation data 700 is provided on the premise that data concerning the amount of parallel movement for all the frames are stored therein. However, it is not always necessary for data concerning the amount of parallel movement for all the frames to be stored therein. The amount of parallel movement for a frame lacking data can be determined by an interpolation between the respective amounts of parallel movement in its preceding and succeeding frames. That is, it is initially determined whether the amount of parallel movement of each cluster in each frame display period is defined or not. If it is determined that the amount of parallel movement of each cluster in the frame display period being processed is not defined, then the amount of parallel movement of each cluster at the frame display period being processed is calculated from the amount of parallel movement of each cluster in a frame display period which has already been processed and the amount of parallel movement of each cluster in a frame display period to be processed later. If it is determined that the amount of parallel movement of each cluster in the frame display period being processed is defined, on the other hand, then the defined amount of parallel movement of each cluster in the frame display period being processed is acquired.

(Modification 2)

Though the above-mentioned embodiment has been explained on the basis of a triangular polygon, the present invention is also applicable to models in which a three-dimensional object is transformed by moving vertexes even in rectangular or other polygons having more sides.

(Modification 3)

Modification of Employed Hardware

FIG. 1 is an example, in which various modifications are possible. Whether or not to provide the communications interface 115 is arbitrary. Since the present invention does not directly relate to sound processing, it is not necessary to provide the sound processing unit 109.

Also, the CD-ROM is an example of recording media, whereas other recording media such as an internal memory like ROM, CD-ROM, DVD-ROM, memory cartridge, floppy disk, magnetic disk, DVD-RAM, and the like can also be used. In this case, it is necessary that the CD-ROM drive 113 be replaced by a drive which can read out the corresponding medium.

Though the foregoing relates to the case where the present invention is implemented by a computer program, it can also be implemented by a combination of a computer program and a dedicated device such as an electronic circuit, or a dedicated device such as an electronic circuit alone.

Though explained in detail with reference to embodiments in the foregoing, the present invention is not restricted to the above-mentioned embodiments. It can be modified within the scope not deviating from the gist thereof. For example, though the above-mentioned embodiments relate to the case where the present invention is realized while using a home game machine as a platform, the present invention may also be realized while using a normal computer, an arcade game machine, or the like as its platform. Also, the present invention may be realized while using a personal digital assistant, a car navigation system, or the like as its platform.

Also, the program and data for realizing the present invention are not restricted to the mode provided by a recording medium mountable/removable with respect to computers, game machines, and the like, such as CD-ROM. Namely, the program and data for realizing the present invention may also be in such a mode that they are recorded in memories of other devices on the network 151 connected to the game machine or the like by way of the communications interface 115 and the communications line 141, and are used as being successively stored into the RAM 105 by way of the communications line 141 as required.

As explained in the foregoing, the present invention can provide a technique which realizes fine transformations of three-dimensional objects by a simple process.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A computer-readable recording medium having recorded therein a video game program for transforming, in a virtual three-dimensional space, a three-dimensional object having a form at least a part of which is determined by a plurality of vertexes associated with a cluster,
said computer-readable recording medium having recorded therein a program for causing a computer to
acquire, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
calculate an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

2. A computer-readable recording medium for a video game according to claim 1, wherein said computer is further caused to
move, according to a movement of a joint in a virtual skeleton defining a framework of said three-dimensional object and including a plurality of joints, each of said plurality of vertexes being associated with at least one of said plurality of joints, said vertex corresponding thereto after the parallel movement of said vertexes.

3. A computer-readable recording medium for a video game according to claim 1, wherein said acquisition of the amount of parallel movement of said cluster includes:
determining whether an amount of parallel movement of each said cluster in a frame display period being processed is defined or not in said animation data;
calculating, if it is determined that the amount of parallel movement of each said cluster in said frame display period being processed is not defined in said animation data, the amount of parallel movement of each said cluster in said frame display period being processed according to an amount of parallel movement of each said cluster in a frame display period having already been processed and an amount of parallel movement of each said cluster in a frame display period to be processed later; and
acquiring, if it is determined that the amount of parallel movement of each said cluster in said frame display period being processed is defined in said animation data, the defined amount of parallel movement of each said cluster in said frame display period being processed.

4. A three-dimensional object transforming method in a video game for transforming a three-dimensional object having a form at least a part of which is determined by a plurality of vertexes associated with a cluster, said method including:
acquiring, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
calculating an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

5. A three-dimensional object transforming method in a video game according to claim 4, further including:
moving, according to a movement of a joint in a virtual skeleton defining a framework of said three-dimensional object and including a plurality of joints, each of said plurality of vertexes being associated with at least one of said plurality of joints, said vertex corresponding thereto after the parallel movement of said vertexes.

6. A three-dimensional object transforming method in a video game according to claim 4, wherein said acquisition of the amount of parallel movement of said cluster includes:
determining whether an amount of parallel movement of each said cluster in a frame display period being processed is defined or not in said animation data;
calculating, if it is determined that the amount of parallel movement of each said cluster in said frame display period being processed is not defined, the amount of parallel movement of each said cluster in said frame display period being processed according to an amount of parallel movement of each said cluster in a frame display period having already been processed and an amount of parallel movement of each said cluster in a frame display period to be processed later; and
acquiring, if it is determined that the amount of parallel movement of each said cluster in said frame display period being processed is defined in said animation data, the defined amount of parallel movement of each said cluster in said frame display period being processed.

7. A video game apparatus, which comprises a computer-readable storage medium storing a program for a video game which transforms a three-dimensional object having a form at least a part of which is determined by a plurality of vertexes associated with a cluster, and a computer which reads out and executes at least one of said programs from said computer-readable storage medium to perform the read out program,
acquiring, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
calculating an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

8. A video game apparatus for transforming a three-dimensional object having a form at least a part of which is determined by a plurality of vertexes associated with a cluster, said apparatus having:
  a computer; and
  a computer-readable recording medium having recorded therein a program to be executed by said computer;
  said program causing said computer to execute:
  an acquiring process for acquiring, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
  a moving process for calculating an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

9. A video game program for transforming a three-dimensional object having a form at least a part of which is determined by a plurality of vertexes associated with a cluster,
  said computer program for causing a computer to
  acquire, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
  calculate an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

10. A computer program for transforming a three-dimensional object having a form at least a part of which is determined by a plurality of vertexes associated with a cluster, said computer program for causing a computer to
  acquire, in each frame display period, an amount of parallel movement of said cluster according to animation data defining a movement of said three-dimensional object and including an amount of parallel movement of said cluster in a plurality of frame display periods, wherein the amount of parallel movement is defined by an amount of movement of said cluster in each of the three-dimensions of the virtual three-dimensional data space; and
  calculate an amount of parallel movement of each said vertex by, for each vertex of said cluster, multiplying the amount of movement of said cluster in each of the three dimensions of the virtual three-dimensional space by a weight predefined for that vertex, and moving, according to these calculated amounts of parallel movement, said vertexes parallel to each other in each said frame display period.

* * * * *